(12) United States Patent
Mizuta et al.

(10) Patent No.: US 6,689,297 B1
(45) Date of Patent: Feb. 10, 2004

(54) METHOD OF MANUFACTURING MAGNETIC RUBBER RING

(75) Inventors: Hideo Mizuta, Okayama (JP); Tsukasa Horichi, Okayama (JP); Yoshihiko Yamaguchi, Okayama (JP)

(73) Assignee: Uchiyama Manufacturing Corp., Okayama (JP)

( * ) Notice: Subject to any disclaimer, the term of this patent is extended or adjusted under 35 U.S.C. 154(b) by 243 days.

(21) Appl. No.: 09/722,596

(22) Filed: Nov. 28, 2000

(30) Foreign Application Priority Data

Feb. 22, 2000 (JP) ......................................... 2000-044443

(51) Int. Cl.[7] ............................................... B29C 47/00
(52) U.S. Cl. ....................... 264/108; 264/148; 264/152; 264/210.6; 264/248
(58) Field of Search ................................ 264/108, 148, 264/152, 157, 210.2, 210.6, 259, 248

(56) References Cited

U.S. PATENT DOCUMENTS

| | | | | |
|---|---|---|---|---|
| 2,204,468 A | * | 6/1940 | Berryman | 264/177.1 |
| 3,246,065 A | * | 4/1966 | Way | 264/130 |
| 4,850,097 A | * | 7/1989 | Graf et al. | 264/210.6 |
| 4,888,074 A | * | 12/1989 | Pocknell | 264/210.2 |
| 5,164,136 A | * | 11/1992 | Comert et al. | 264/259 |
| 2002/0183427 A1 | * | 12/2002 | Yamaguchi | 524/261 |

FOREIGN PATENT DOCUMENTS

| | | | | |
|---|---|---|---|---|
| EP | 745857 A1 | * | 12/1996 | G01P/3/44 |
| EP | 1184668 A2 | * | 3/2002 | G01P/3/487 |
| JP | 2001138351 A | * | 5/2001 | B29C/43/18 |
| JP | 2001143931 A | * | 5/2001 | H01F/13/00 |
| JP | 2002071382 A | * | 3/2002 | G01D/5/245 |

* cited by examiner

*Primary Examiner*—Mark Eashoo
(74) *Attorney, Agent, or Firm*—Wenderoth, Lind & Ponack, L.L.P.

(57) ABSTRACT

A method of manufacturing a magnetic rubber ring comprises: providing an unvulcanized rubber containing rubber materials and magnetic powers; using an extruding machine to extrude the unvulcanized rubber into a rubber band having a nearly round cross section; cutting the rubber band into a strip of rubber band of a predetermined length; forming a rubber band ring by joining opposite ends of the strip of rubber band together, wherein the opposite ends of the strip of rubber band have respective meeting slanted faces cut at a predetermined angle such that a joint of the rubber band ring obtained by joining the opposite ends of the strip of rubber band become thinner in a direction of compression when the rubber band ring is compressed in a direction of its center line; and compressing the rubber band ring under applied heating in the direction of the center line.

21 Claims, 5 Drawing Sheets

METHOD OF MANUFACTURING MAGNETIC RUBBER RING

BACKGROUND OF THE INVENTION

1. Field of the Invention

The present invention relates to a method of manufacturing a magnetic rubber ring, and more particularly to a method of manufacturing a magnetic rubber ring wherein the magnetic rubber ring thus obtained can provide high magnetic forces that are polarized regularly and distributed evenly around its circumference when it is subsequently placed in a magnetic field and then becomes magnetized.

2. Prior Art

A conventional method for manufacturing a magnetic rubber ring of the type referred to above is known, in which an unvulcanized rubber that contains a mixture of an adequate quantity of rubber material and magnetic powders is flattened into a flat rubber sheet by a roll sheeting process. The flat rubber sheet is cut into a square rubber band of a given length having opposite ends cut like slits, and the square rubber band is formed into a rubber band ring by temporarily joining the opposite ends of the square rubber band together. Finally, the rubber band ring is placed in a metal mold where it is compression molded into a finished magnetic rubber ring.

Another conventional method for manufacturing a magnetic rubber ring of the type referred to above is also known. This method, which is more widely used, is designed to provide improved workability and moldability. Specifically, this method consists of using an extruding machine to extrude an unvulcanized rubber containing rubber material and magnetic powders into a rubber band of a given length and having a nearly round cross section, forming a rubber band ring by temporarily joining opposite ends of the rubber band together, and placing the rubber band ring in a metal mold where it is compression molded into a finished magnetic rubber ring.

According to the first mentioned method in which unvulcanized rubber containing an adequate quantity of rubber material and magnetic powders is flattened into a flat rubber sheet by a roll sheeting process, the unvulcanized rubber containing an adequate quantity of rubber material and magnetic powders may inevitably become harder since it originally contains magnetic powders. This is not desirable because a kneading or mixing process for components such as rubber material and magnetic powders can only take place with extreme difficulty. This also applies to the roll sheeting process, where the unvulcanized rubber containing the adequate quantity of rubber material and magnetic powders is flattened into the flat rubber sheet, as well as a process of cutting the flat rubber sheet into a square rubber band of a given length having opposite ends cut like slits. These processes involve much labor and time.

The magnetic powders, such as ferrites, that are contained in the square rubber band normally have poles aligned in an orderly regular fashion, and in one particular direction before it is formed into a rubber band ring. If the square rubber band is twisted inadvertently at or near a middle point thereof when its opposite ends are temporarily joined together to form a rubber band ring, the magnetic powders contained in the rubber band ring would have poles disturbed in a disorderly fashion and oriented irregularly in a circumferential direction of the rubber band ring. Therefore, extreme care is required to ensure that such twisting does not occur at or near the middle point of the square rubber band when the square rubber band is formed into the rubber band ring by temporarily joining the opposite ends of the square rubber band together. This process is not recommended because it must proceed under laborious working conditions as described.

According to the above method, as described above, the magnetic rubber ring may be obtained by cutting the magnetic rubber sheet into the square rubber band having opposite ends cut like slits, forming the square rubber band into the rubber band ring by temporarily joining the opposite ends of the square rubber band together, and placing the rubber band ring into the metal mold where it is compression molded into a finished magnetic rubber ring. This method has a major disadvantage, however, in that when the finished magnetic rubber ring is placed in a magnetic field and is then magnetized, magnetic forces that are produced by the magnetic rubber ring may have poles disturbed in a disorderly fashion and oriented irregularly in a circumferential direction. As a consequence, it is practically difficult to provide a magnetic rubber ring that produces uniform and powerful magnetic forces all over a circumferential direction, when it the ring is placed in a magnetic field and then becomes magnetized.

Thus, it is desirable to provide a method that may provide a magnetic rubber ring that produces uniform and powerful magnetic forces anywhere in a circumferential direction when the ring is placed in a magnetic field and then becomes magnetized.

It may be appreciated from the foregoing description that there are two factors that may potentially cause disturbed magnetic forces in a circumferential direction when a magnetic rubber ring is placed in a magnetic field and then becomes magnetized.

The first factor is that magnetic powders, such as ferrites, that are originally contained in a rubber sheet obtained by a roll sheeting process may have poles that are not oriented regularly.

The second factor is that when a square rubber band is formed into a rubber band ring by temporarily joining opposite ends thereof together, a joint is obtained by simply overlapping slit-like cut faces of opposite ends in a direction in which the ends are compressed, and ferrites contained in a molded rubber band ring may therefore have their pole orientation disturbed at a joint of the opposite ends when the ring is molded, which may cause poles of the ferrites to be oriented irregularly.

As a consequence, it is practically difficult to produce a magnetic rubber ring that provides uniform and powerful magnetic forces all over a circumferential direction of a magnetic rubber ring without disturbing magnetic orientation at a joint of the ring, when the ring is placed in a magnetic field and then becomes magnetized.

Therefore, it is desirable to provide a method that provides a magnetic rubber ring that produces uniform and powerful magnetic forces anywhere in a circumferential direction of the ring when the ring is placed in a magnetic field.

In order to solve the problems described above, a second-mentioned process for manufacturing a magnetic rubber ring is proposed, in which a mixture containing rubber material and magnetic powders, such as ferrites, are extruded into a rubber band by using an extruding machine. This allows ferrites to be aligned in a direction of extrusion.

Even when the above-described extruding machine is used, however, this method has the same problem as does the preceding method. Specifically, when a rubber band obtained by extrusion is formed into a rubber band ring, a joint of the rubber band is obtained by simply overlapping cut faces of opposite ends of the rubber band in a direction in which the rubber band is compressed. This is similar to the rubber band that is obtained by performing the roll sheeting process, and then is cut into a strip of a rubber band having opposite ends cut like slits. Thus, ferrites that are initially aligned and oriented regularly at a time of extrusion molding may be disturbed at a joint of the rubber band when the rubber band ring is formed. When a magnetic rubber ring thus formed is placed in a magnetic field and then becomes magnetized, ferrites contained in the magnetic rubber ring may produce magnetic forces whose orientation is disturbed at a joint of the ring. Thus, uniform magnetic forces in a circumferential direction of a magnetized rubber ring cannot be produced.

SUMMARY OF THE INVENTION

In light of the problems of the prior art methods as described above, it is an object of the present invention to provide a method of manufacturing a magnetic rubber ring that can produce uniform and powerful magnetic forces anywhere in a circumferential direction of the ring when it the ring is placed in a magnetic field and then becomes magnetized.

Specifically, the present invention solves those problems by providing a method of manufacturing a magnetic rubber ring, which comprises:

providing an unvulcanized rubber that contains rubber material and magnetic powders;

using an extruding machine to extrude the unvulcanized rubber into a rubber band having a nearly round cross section;

cutting the rubber band having the nearly round cross section into a strip of rubber band having a predetermined length, and forming each of opposite ends of the strip of rubber band so as to have a meeting face slanted at a predetermined angle;

forming a rubber band ring by joining together the opposite ends of the strip of rubber band having respective meeting faces slanted at the predetermined angle; and     compressing, under applied heating, the rubber band ring in a direction of a center line extending through a center of the rubber band ring, and thereby obtaining a finished magnetic rubber ring.

Prior to cutting the rubber band, the predetermined angle, at which the opposite ends of the strip of rubber band are formed to have the respective meeting slanted faces, may be chosen such that the joint between the opposite ends of the strip of rubber band, that is obtained when the strip of rubber band is formed into a rubber band ring, may become thinner in a direction of compression that occurs when the rubber band ring is compressed in the direction of its center line.

The above-described method includes five steps, but this is only shown for purpose of convenience. Cutting the rubber band and forming each of the opposite ends may be separated into two independent steps; that is, a step of cutting and a step of forming. Thus, the method may include the six steps. Additionally, cutting the rubber band and forming each of the opposite ends may be combined with the step of joining the opposite ends together. Thus, the method may include four steps.

Now, the above-described third step through fifth step are described in further detail. A rubber band that is obtained by extrusion, so that the rubber band has a nearly round cross section, is cut into a strip of rubber band having a predetermined length. When the strip of rubber band is formed into a rubber band ring, opposite ends of the strip of rubber band are joined together so that a joint of the opposite ends forms an angle of 20 degrees to 70 degrees with respect to a plane perpendicular to a center line extending through a center of the rubber band ring. Then, in order to compress the rubber band ring into a magnetic rubber ring under applied heating, the ring is placed in a metal mold that includes an upper mold and a lower mold, placed above and below and parallel to the plane perpendicular to the center line of the rubber band ring, in which mold the ring is compressed in the direction of the center line under applied heating.

According to the present invention, a joint of rubber band ring 4 that is obtained by joining opposite ends 5, 6 of strip of rubber band 2a contains the magnetic powders whose poles are oriented relatively regularly, and magnetic rubber ring 24 that results from the rubber band ring 4 also contains magnetic powders whose poles are oriented relatively regularly in a circumferential direction of the magnetic rubber ring.

Accordingly, when the magnetic rubber ring 24 is placed in a magnetic field and then becomes magnetized, the ring can produce powerful magnetic forces that are oriented in one particular direction, and are distributed regularly all over a circumferential direction of the ring.

More specifically, the magnetic rubber ring 24 that is obtained in accordance with the method of the present invention is based on unvulcanized rubber containing any suitable unvulcanized rubber material and any suitable magnetic powders, in which the magnetic powders are originally aligned and oriented relatively regularly in a circumferential direction of a finished magnetic rubber ring 24. Accordingly, when the magnetic rubber ring 24 is magnetized, it can produce powerful magnetic forces that are distributed uniformly all over a circumferential direction of the ring.

Another advantage of the method of the present invention lies in the fact that it can simplify a process of extruding unvulcanized rubber, containing an adequate quantity of rubber material and magnetic powders, into rubber band 2 having a nearly round cross section. This is because when this process takes place, what is required is only to adjust a diameter of the rubber band 2.

A further advantage of the method of the present invention lies in the fact that rubber band 2 has a nearly round cross section. This minimizes a risk of the rubber band 2 being twisted or falling due to misplacement, and facilitates formation of opposite ends 5, 6 of strip of rubber band 2a and joining of the opposite ends for forming rubber band ring 4.

Another advantage of the method of the present invention lies in the fact that it simplifies a process of manufacturing magnetic rubber ring 24, and is easy to perform. Thus, magnetic rubber ring 24 can be produced in a simple and effective manner.

BRIEF DESCRIPTION OF THE DRAWINGS

FIG. 4(*a*) and FIG. 4(*b*) show side elevational views of a rubber band, in which FIG. 4(*a*) is a side elevational views showing how opposite ends are cut at a preferred angle.

FIG. 7(a) to FIG. 7(c) show schematic sectional diagrams illustrating a process of compressing a rubber band ring under applied heating into a finished magnetic rubber ring, in which FIG. 8(a) and FIG. 8(b) show a finished magnetic rubber ring, in which

DETAILED DESCRIPTION OF THE PREFERRED EMBODIMENTS

Now, a method of manufacturing a magnetic rubber ring according to a preferred embodiment of the present invention is described by referring to the accompanying drawings.

Figure 1:
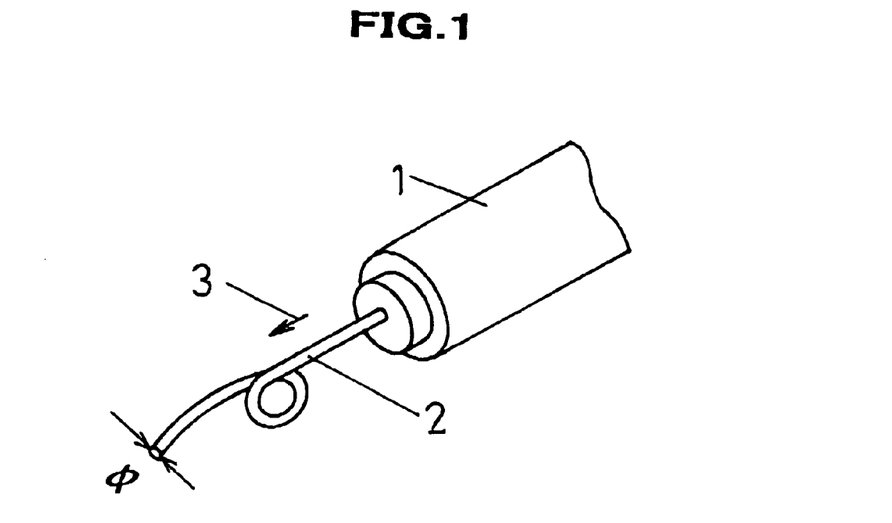
FIG. 1 is a perspective view illustrating how unvulcanized rubber containing rubber material and magnetic powders is extruded into a rubber band 2 having a nearly round cross section.

As a preliminary step, an unvulcanized rubber is prepared, which contains a mixture of rubber material and magnetic powders such as ferrites. Then, an extruding machine 1 is used to extrude the unvulcanized rubber into a rubber band 2 that has a nearly round cross section (FIG. 1).

Figure 4A:
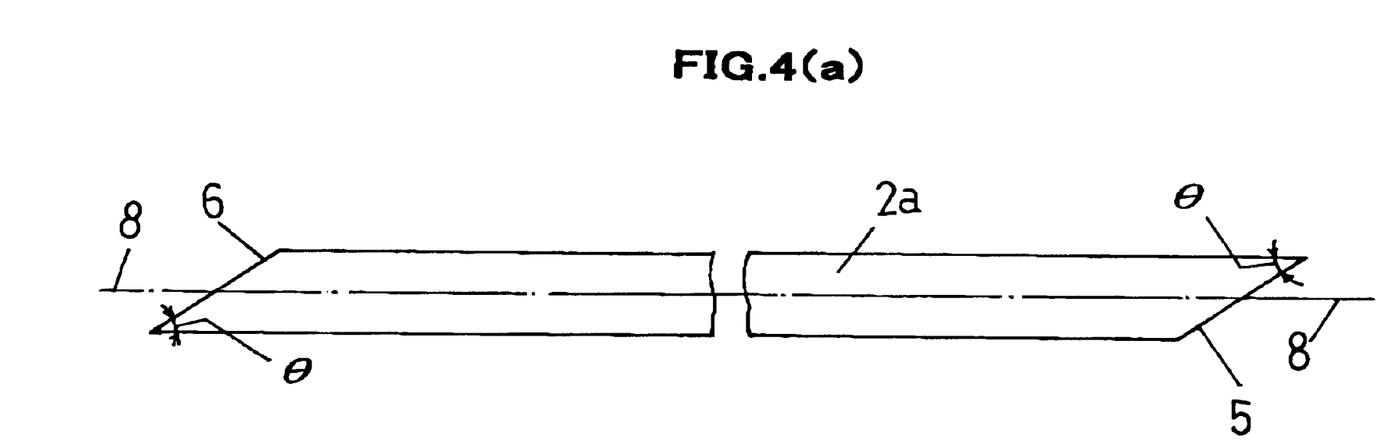
Figure 4B:
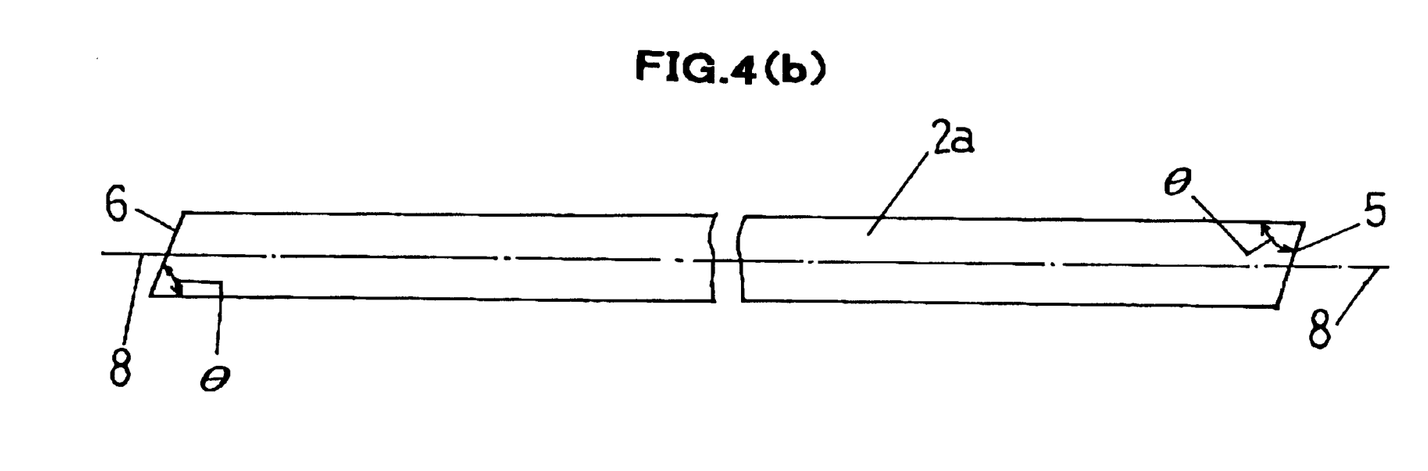
FIG. 4(b) is a side elevational views showing how opposite ends are cut at another preferred angle.

The rubber band 2 thus obtained is then cut into a strip of rubber band 2a (FIG. 4(a), FIG. 4(b)). The strip of rubber band 2a has a length that is sufficient to allow a rubber band ring 4 to be formed with a diameter nearly equal to a diameter of a magnetic rubber ring 24 that will subsequently be formed as a final product from the rubber band ring 4.

Figure 2:
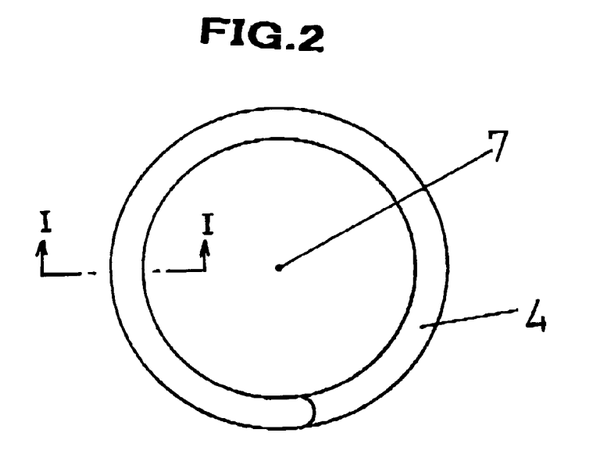
FIG. 2 is a plan view showing a rubber band ring after it is formed.
Figure 3:
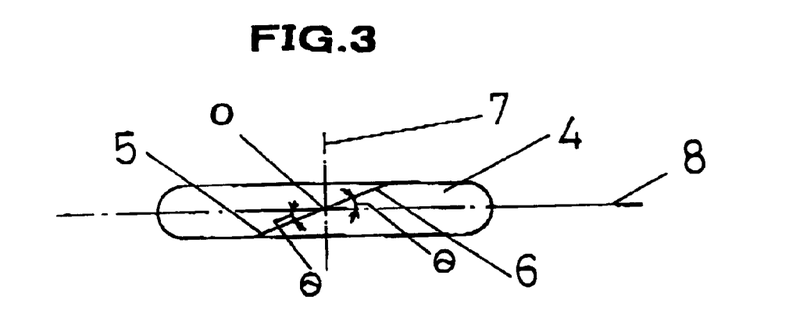
FIG. 3 is a front view of FIG. 2.

Then, the strip of rubber band 2a is formed into a rubber band ring 4 that has an O-ring like form as shown in FIGS. 2 and 3.

Figure 5:
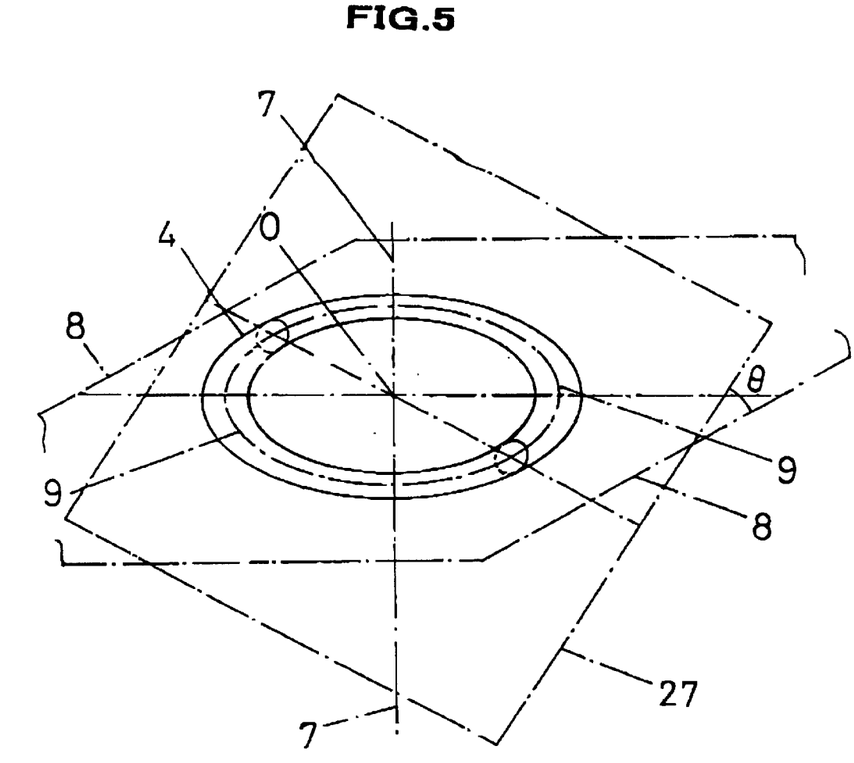
FIG. 5 is a perspective view illustrating a joint of a rubber band ring obtained by joining opposite ends of a rubber band together.

In forming the rubber band ring 4, opposite ends 5, 6 of the strip of rubber band 2a are formed to have respective meeting faces that are cut at angles of 20 degrees to 70 degrees with reference to plane 8 (FIG. 3, FIG. 4(a), FIG. 4(b)) that is perpendicular to a center line 7 (FIG. 2) extending through a center of the O-ring like rubber band ring 4. The opposite ends 5, 6 of the strip of rubber band 2a having the respective meeting faces are then joined together, forming a rubber band ring 4 (FIG. 2, FIG. 3, FIG. 5).

A metal mold that may be used for compression molding includes an upper mold 11 and a lower mold 10 (FIG. 6) that are placed above and below, and parallel to, the plane 8 that is perpendicular to the center line 7 of the rubber band ring 4. Then, the rubber band ring 4 is placed in the metal mold where it is compressed under applied heating in a direction of the center line 7, which results in magnetic rubber ring 24 (FIG. 8(a), FIG. 8(b)).

Figure 6:
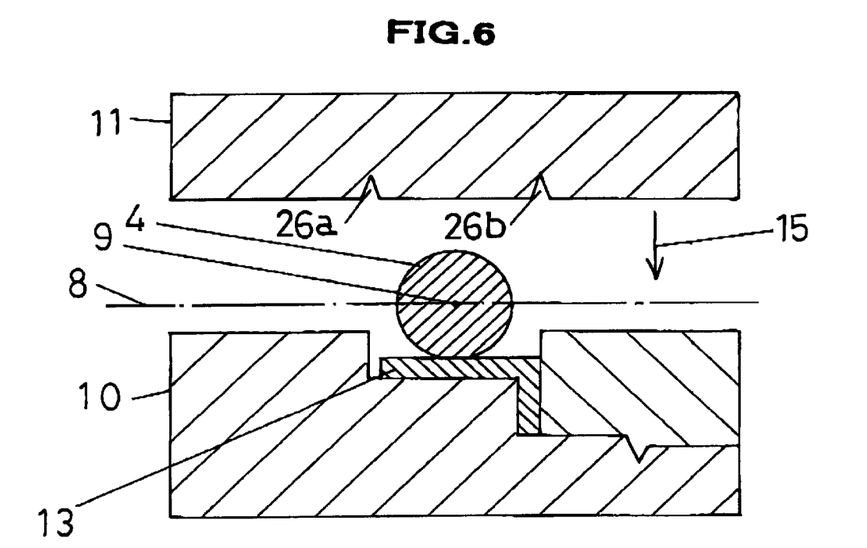
FIG. 6 is a sectional view illustrating how the rubber band ring is compressed under applied heating.
Figure 7A:
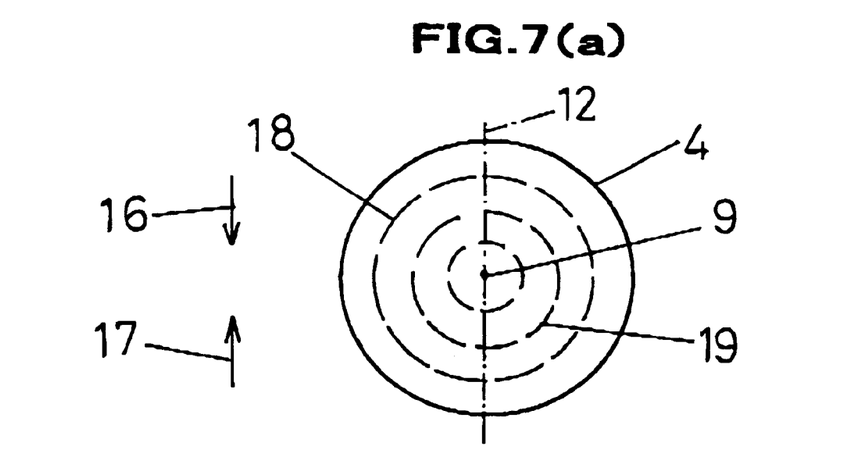
FIG. 7(a) is a cross sectional view taken along line I—I in FIG. 2.
Figure 7B:
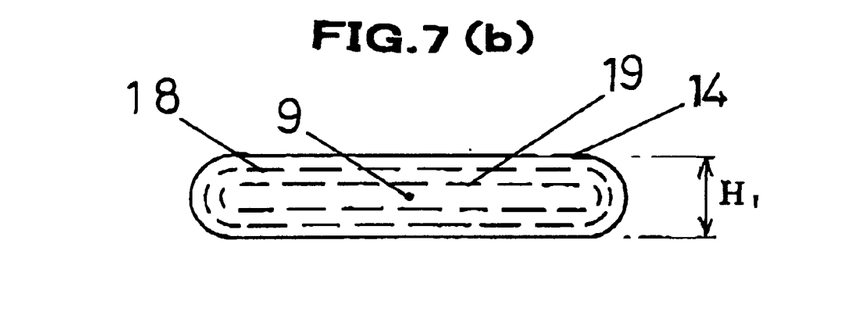
FIG. 7(b) is a cross sectional view during compression of the rubber band ring under the applied heating.

According to the method of the invention, a joint that is obtained by joining the opposite ends 5, 6 of the strip of rubber band 2a together to form the rubber band ring 4 may be compressed in the direction of the center line 7 of the rubber band ring 4 as the rubber band ring is compressed in the direction of the center line 7, and may thus become thinner in the direction of the center line 7 (FIG. 6, FIG. 7(a), FIG. 7(b)). At the same time, the opposite ends 5, 6 of the strip of rubber band 2a may be extended and expanded in a direction of a central axis 9 of the rubber band ring 4.

Accordingly, a problem that the magnetic powders may have an irregular orientation at the joint of the rubber band ring 4 formed by the opposite ends 5, 6 of the strip of rubber band 2a can be avoided.

The magnetic rubber ring 24 thus obtained may contain magnetic powders that are aligned and oriented relatively regularly all over a circumferential direction of the magnetic rubber ring. Thus, a finished magnetic rubber ring 24 can provide relatively regularly oriented, powerful magnetic forces when it is placed under a magnetic field and then becomes magnetized.

In a process of forming the rubber band ring 4, an annular core metal 13 (FIG. 6) may be attached to the rubber band ring 4. This may improve working efficiency when the strip of rubber band 2a is formed into the O-ring like rubber band ring 4. Because a finished magnetic rubber ring 24 that is thus obtained includes the annular core metal 13, the magnetic rubber ring is advantageous in terms of its mechanical strength, ease of storage and ease of transportation.

In a process of forming the rubber band ring 4, it is preferable that the strip of rubber band 2a have the opposite ends 5, 6 cut to provide good flatness, and the opposite ends 5, 6 should meet each other with such good flatness and should then be joined together. This can keep the magnetic powders oriented regularly at the joint of the opposite ends 5, 6.

Referring to the accompanying drawings, an example of the preferred embodiment is now described.

Initially, an unvulcanized rubber is prepared. The unvulcanized rubber may contain polymers such as NBR (nitrobutadiene rubber) or H-NBR (hydrogen added nitrobutadiene rubber) and 70% to 98% by weight of magnetic powders such as ferrites, to which any suitable rubber chemical may be added.

In the composition shown above, it is noted that the value range of 70% to 98% is preferred because less than 70% would prevent a finished magnetic rubber ring from producing sufficient magnetic forces, while more than 98% would make the unvulcanized rubber harder, which would affect molding efficiency.

Extruding machine 1 that may be used for forming the rubber band 2 is known to the prior art. This extruding machine 1 may be used for extruding unvulcanized rubber so that the magnetic powders, or ferrites, can be aligned regularly in a direction of extrusion.

Unvulcanized rubber is fed through the extruding machine 1, which produces a rubber band 2 by extruding an input in a direction of an arrow 3 (FIG. 1). The rubber band 2 that results from extrusion has a nearly round cross section, having a diameter $\phi$ of on the order of 1 mm to 15 mm (FIG. 1).

In this case, the rubber band 2 should preferably have a nearly round cross section in order to avoid an occurrence in which the rubber band 2, or the strip of rubber band 2a obtained by cutting the rubber band 2 to a particular length, will be twisted or dropped due to misplacement when it is being handled. Therefore, whether it the rubber band 2 is truly round or nearly round does not matter so long as the rubber band is sufficiently round to prevent the rubber band 2, or its strip of rubber band 2a, from being twisted or dropped due to careless handling. The term "round" referred to herein includes all forms of roundness and includes deviations from prefectly round.

The extruding machine 1 is capable of aligning ferrites contained in unvulcanized rubber in a direction of extrusion when the rubber is extruded through the machine 1. Thus, a resulting rubber band 2 can contain ferrites 18, 19 that are aligned regularly, and the rubber band ring 4 formed from such rubber band 2 can contain the ferrites 18, 19 that are oriented symmetrically with regard to the central axis 9 (FIG. 7(a)).

Then, the rubber band 2 is cut into a strip of rubber band 2a (FIG. 4(a), FIG. 4(b)). The strip of rubber band 2a has a length that is sufficient to allow a rubber band ring 4 to be formed with a diameter that is nearly equal to a diameter of a magnetic rubber ring 24 that will subsequently be formed as a final product from the rubber band ring 4.

In cutting the rubber band 2 into the strip of rubber band 2a of a specific length, opposite ends 5, 6 (FIG. 3, FIG. 4(a), FIG. 4(b)) of the strip of rubber band 2a should be cut to provide good flatness, by taking into account the fact that the opposite ends 5, 6 should form a joint of the rubber band ring 4 by meeting each other, when it the rubber band ring is formed from the strip of rubber band 2a. This is preferable for the ferrites contained in the rubber band ring 4 to be oriented relatively regularly at a joint of the opposite ends 5, 6.

In order to provide good flatness, it is preferable that the opposite ends 5, 6 be cut sharply by using a cutter or knife. For example, a supersonic cutter may be used. Although better flatness may be obtained by using a supersonic cutter, it is important that cutting should be performed on the opposite ends 5, 6 very carefully without affecting any other parts of the rubber band 2.

Referring next to FIGS. 2 and 3, the strip of rubber band 2a of the specific length is formed into an O-ring like shape, which will form a rubber band ring 4 as described below.

The rubber band ring 4 may be formed by joining the opposite ends 5, 6 of the strip of rubber band 2a together such that the opposite ends 5, 6 can meet each other at a joint at angles θ of 20 degrees to 70 degrees with reference to plane 8 that is perpendicular to center line 7 of the rubber band ring 4 being formed (FIG. 3, FIG. 4(a), FIG. 4(b)).

More specifically, rubber band 2 may be provided by extruding an unvulcanized rubber fed through the extruding machine 1, and may be cut into a strip of rubber band 2a of a specific length. In this case, opposite ends 5, 6 of the strip of rubber band 2a may be cut to have good flatness, and may meet each other at angles of between 20 degrees (FIG. 4(a)) to 70 degrees (FIG. 4(b)) with reference to plane 8 that is perpendicular to center line 7 extending through a center of a rubber band ring 4 being formed. Then, the rubber band ring 4 may be obtained by joining the opposite ends 5, 6 of the strip of rubber band 2a together such that the ends meet each other at the above angles.

It should be noted that the opposite ends 5, 6 of the strip of rubber band 2a may be joined together temporarily, because the strip of rubber band will undergo the following step where it is compressed under applied heating as described later.

In order to allow the ferrites in the rubber band ring 4, obtained by joining the opposite ends 5, 6 of the strip of rubber band 2a, to be aligned and oriented relatively regularly at the joint of the opposite ends, the opposite ends 5, 6 of the strip of rubber band 2a that meet each other should preferably be cut at angles θ of between 20 degrees (FIG. 4(a)) and 70 degrees (FIG. 4(b)) with reference to plane 8 that is perpendicular to center line 7 of the rubber band ring 4 being formed.

A reason for this is that by joining the opposite ends 5, 6 together at these angles, a magnetic rubber ring 24 that will be a final product can provide magnetic forces that are aligned and oriented relatively regularly at the joint of the opposite ends, when it the magnetic rubber ring is placed in a magnetic field and then becomes magnetized.

Most preferably, the opposite ends 5, 6 of the strip of rubber band 2a should meet each other at the angles θ of between 20 degrees and 70 degrees with reference to plane 8 that is perpendicular to center line 7 of the rubber band ring 4 as described above, and a conceptual plane 27, which is formed by extending surfaces of opposite ends 5, 6, should include a center point O of the rubber band ring 4 as shown in FIG. 5.

As the opposite ends 5, 6 of the strip of rubber band 2a are formed in the manner described above, when they are joined together by allowing them to meet each other, they can meet each other at the same slanted angles θ without any gap over their contact area. Accordingly, when the opposite ends 5, 6 are then joined together, a joint of the rubber band ring 4, thus formed by the opposite ends 5, 6 of the strip of rubber band 2a being joined together, can contain the ferrites that are aligned and oriented relatively regularly.

Then, the rubber band ring 4 thus formed is placed in a metal mold. The metal mold includes upper mold 11 and lower mold 10 that are placed above and below plane 8 that is perpendicular to center line 7 of the rubber band ring 4, and parallel to the plane 8. In the metal mold, the rubber band ring 4 is molded under applied heating by applying a compressing force to the rubber band ring in a direction of the center line 7 (FIG. 6), which will be described below.

Compression molding is accomplished by placing the rubber band ring 4 on the lower mold 10 that is placed in a fixed position parallel to plane 8 that is perpendicular to center line 7 of the rubber band ring 4, and then by moving the upper mold 11 that is parallel to plane 8 that is perpendicular to center line 7 of the rubber band ring 4; in this case by moving the upper mold 11 down in a direction of an arrow 15 (FIG. 6). This compresses the rubber band ring 4 in direction of arrows 16, 17 (FIG. 7(a)), which rubber band ring is compressed under applied heating in the direction of center line 7.

When the rubber band ring 4 is compressed as above, a joint of the rubber band ring 4 obtained by joining the opposite ends 5, 6 of the strip of rubber band 2a is also compressed in the direction of center line 7 of the rubber band ring 4, so that the joint is flattened in the direction of the center line 7, thereby becoming thinner. At the same time, the opposite ends 5, 6 of the strip of rubber band 2a are extended and expanded in a direction of central axis 9 of the rubber band ring 4 thus being formed.

Figure 7C:
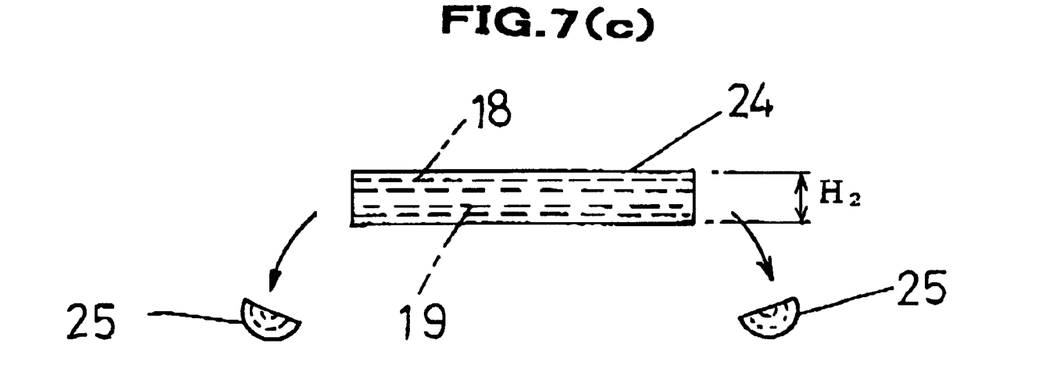
FIG. 7(c) is a cross sectional view of a finished magnetic rubber ring after compression of the rubber band ring is completed.

The rubber band ring 4 thus formed is compressed until it is flattened to a specific thickness H1 as shown in FIG. 7(b), which may further be compressed until it is flattened to a smaller thickness H2 as shown in FIG. 7(c). Finally, magnetic rubber ring 24 (FIG. 8(a), FIG. 8(b)) is obtained, which contains ferrites that are aligned regularly and oriented in one particular direction.

In FIG. 7(c), reference numeral 25 represents burrs formed by slits 26a, 26b (FIG. 6) on the upper mold 11 during a compression molding process.

Figure 8A:
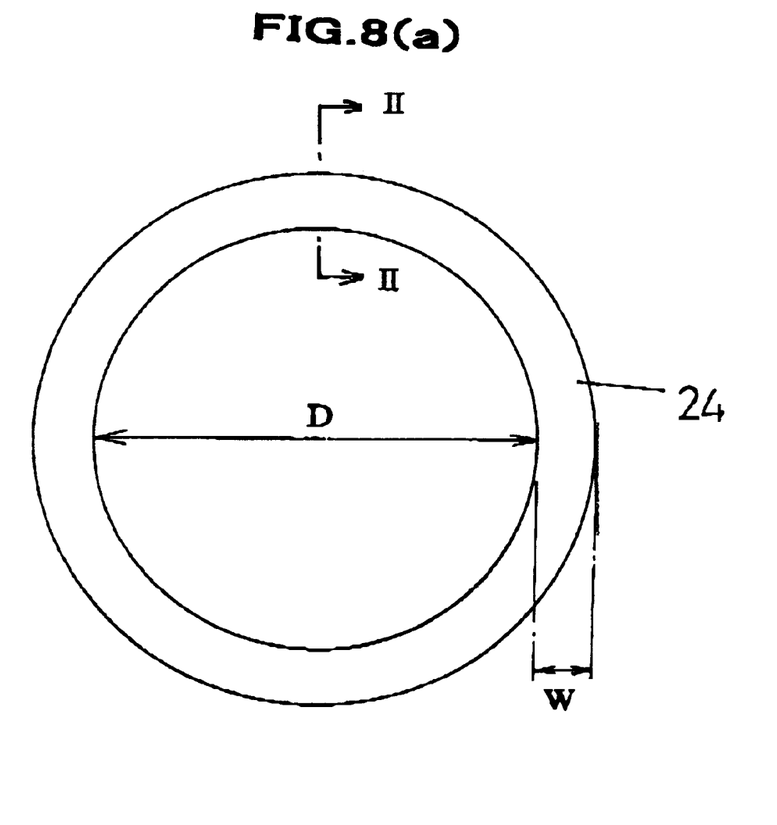
FIG. 8(a) is a plan view.
Figure 8B:
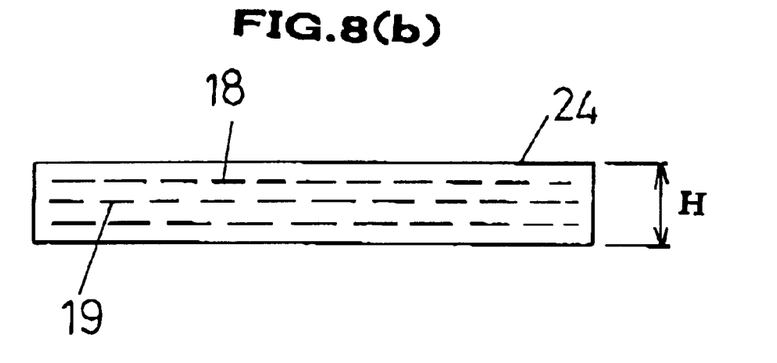
FIG. 8(b) is a cross sectional view taken along line II—II in FIG. 8(a).

FIG. 8(a) and FIG. 8(b) represent one typical example of magnetic rubber ring 24 obtained as described so far, which has a diameter D of 50 mm (FIG. 8(a)), a width W of 5 mm (FIG. 8(a)), and a thickness H of 1 mm (FIG. 8(b)). This magnetic rubber ring 24 may be used with an encoder, for example.

According to the method that has been described so far in connection with the particular embodiment of the present invention, the rubber band ring 4 is compressed in the direction of center line 7 as shown by arrows 16, 17 (FIG. 7(a)). As the rubber band ring 4 is compressed, the joint of the rubber band ring 4 obtained by joining the opposite ends 5, 6 of the strip of rubber band 2a together is also compressed in the direction of center line 7, thereby becoming thinner in the direction of center line 7. At the same time, the opposite ends 5, 6 of the strip of rubber band 2a that have been joined to form the joint of the rubber band ring 4 are extended and expanded in the direction of central axis 9 of the rubber band ring 4.

Thus, the joint of the rubber band ring 4 formed by the opposite ends 5, 6 of the strip of rubber band 2a contains regularly aligned ferrites.

The finished magnetic rubber ring 24 that is formed from the rubber band ring 4 including the above joint also contains regularly aligned ferrites, which are oriented regularly all over a circumference of the magnetic rubber ring 24.

Accordingly, when the magnetic rubber ring 24 is placed in a magnetic field and then becomes magnetized, the magnetic rubber ring will produce uniformly oriented, powerful magnetic forces that are regular in a direction of the circumference of the magnetic rubber ring.

It will be appreciated that in forming the rubber band ring 4, it is formed from the strip of rubber band 2a alone, but it may be supplemented by an annular core metal 13 (FIG. 6), which provides mechanical strength for a finished magnetic rubber ring 24. In this case, the annular core metal 13 is attached to the rubber band ring 4 by thermal bonding or by using any adhesive.

Attaching the annular core metal 13 to the rubber band ring 4 is accomplished after the rubber band ring 4 is formed from the strip of rubber band 2a, or while the rubber band ring 4 is being formed into an O-ring like shape from the strip of rubber band 2a.

In the embodiment described so far, unvulcanized rubber is prepared to include ferrites as magnetic powders. This is because ferrites are available at low cost, are capable of retaining magnetism when they are magnetized, and can be treated easily when a kneading or extruding process takes place. Any other type of magnetic materials that meet the above requirements may also be used.

Although the present invention has been described in connection with the particular preferred embodiments by referring to the accompanying drawings, it should be understood that the present invention is not limited to these embodiments, and various changes and modifications may be made without departing from the true spirit and scope of the invention as defined in the appended claims.

What is claimed is:

1. A method of manufacturing a magnetic rubber ring, comprising:
   providing an unvulcanized rubber that contains rubber material and magnetic powder;
   extruding said unvulcanized rubber into a band;
   cutting said band into a strip having a predetermined length, with opposite ends of said strip each having a face that is slanted at a predetermined angle;
   contacting said face at one of said opposite ends of said strip with said face at another of said opposite ends of said strip so as to define a portion where said faces contact one another such that a ring is formed having a centerline axis passing therethrough; and
   while applying heat to said ring, compressing said ring in a direction of said centerline axis such that said portion where said faces contact one another becomes thinner in said direction of said centerline axis,
   wherein said faces are slanted relative to a plane that is orthogonal to said centerline axis passing through said ring such that after said strip is formed into said ring one of said faces superposes another of said faces in the direction of said centerline axis.

2. The method according to claim 1, wherein
   extruding said unvulcanized rubber into a band comprises using an extruding machine to extrude said unvulcanized rubber into a band having a nearly round cross section.

3. The method according to claim 2, wherein
   contacting said face at one of said opposite ends of said strip with said face at another of said opposite ends of said strip comprises joining said face at said one of said opposite ends of said strip to said face at said another of said opposite ends of said strip so as to define a portion where said faces are joined to one another, such that compressing said ring in a direction of said centerline axis results in said portion where said faces are joined to one another becoming thinner in said direction of said centerline axis.

4. The method according to claim 3, further comprising: attaching an annular metal core to said ring.

5. The method according to claim 3, wherein said faces are flat.

6. The method according to claim 3, wherein
   compressing said ring in a direction of said centerline axis results in a width of said ring being increased, with said width being orthogonal to said centerline axis, and also results in upper and lower surfaces of said ring being flattened.

7. The method according to claim 1, wherein
   extruding said unvulcanized rubber into a band comprises using an extruding machine to extrude said unvulcanized rubber into a band having a nearly round cross section.

8. The method according to claim 7, wherein
   contacting said face at one of said opposite ends of said strip with said face at another of said opposite ends of said strip comprises joining said face at said one of said opposite ends of said strip to said face at said another of said opposite ends of said strip so as to define a portion where said faces are joined to one another, such that compressing said ring in a direction of said centerline axis results in said portion where said faces are joined to one another becoming thinner in said direction of said centerline axis.

9. The method according to claim 8, further comprising: attaching an annular metal core to said ring.

10. The method according to claim 8, wherein said faces are flat.

11. The method according to claim 1, wherein
    compressing said ring in a direction of said centerline axis results in a width of said ring being increased, with said width being orthogonal to said centerline axis, and also results in upper and lower surfaces of said ring being flattened.

12. The method according to claim 1, wherein
    compressing said ring in a direction of said centerline axis results in a width of said ring being increased, with said width being orthogonal to said centerline axis, and also results in upper and lower surfaces of said ring being flattened.

13. A method of manufacturing a magnetic rubber ring, comprising:

providing an unvulcanized rubber that contains rubber material and from 70% to 98% by weight magnetic powder;

extruding said unvulcanized rubber into a band;

cutting said band into a strip having a predetermined length, with opposite ends of said strip each having a face that is slanted at a predetermined angle of from 20° to 70° relative to a plane passing through said opposite ends of said strip;

contacting said face at one of said opposite ends of said strip with said face at another of said opposite ends of said strip so as to define a portion where said faces contact one another such that a ring is formed having a centerline axis passing therethrough which is orthogonal to a plane passing through said faces, with said plane passing through said faces corresponding to said plane that passed through said opposite ends of said strip such that one of said faces superposes another of said faces in the direction of said centerline axis; and while applying heat to said ring, compressing said ring in a direction of said centerline axis.

14. The method according to claim 13, wherein extruding said unvulcanized rubber into a band comprises extruding said unvulcanized rubber into a band having a nearly round cross section.

15. The method according to claim 14, wherein contacting said face at one of said opposite ends of said strip with said face at another of said opposite ends of said strip comprises joining said face at said one of said opposite ends of said strip to said face at said another of said opposite ends of said strip so as to define a portion where said faces are joined to one another.

16. The method according to claim 15, wherein compressing said ring in a direction of said centerline axis comprises placing said ring between an upper mold and a lower mold such that said plane passing through said faces is parallel to and between said upper mold and said lower mold, and moving said upper mold and said lower mold relatively toward one another.

17. The method according to claim 16, further comprising:

attaching an annular metal core to said ring.

18. The method according to claim 16, wherein said faces are flat.

19. The method according to claim 16, wherein compressing said ring in a direction of said centerline axis results in a width of said ring being increased, with said width being orthogonal to said centerline axis, and also results in upper and lower surfaces of said ring being flattened.

20. The method according to claim 14, wherein compressing said ring in a direction of said centerline axis results in a width of said ring being increased, with said width being orthogonal to said centerline axis, and also results in upper and lower surfaces of said ring being flattened.

21. The method according to claim 13, wherein compressing said ring in a direction of said centerline axis results in a width of said ring being increased, with said width being orthogonal to said centerline axis also results in upper and lower surfaces of said ring being flattened.

* * * * *